US005738398A

United States Patent [19]
Miano

[11] Patent Number: 5,738,398
[45] Date of Patent: Apr. 14, 1998

[54] SELF-WRAPPING CARRYING DEVICE

[76] Inventor: R. Ross Miano, P.O. Box 429, Reserve, La. 70084

[21] Appl. No.: 647,065

[22] Filed: May 9, 1996

[51] Int. Cl.⁶ ................................................. B65D 63/00
[52] U.S. Cl. ............................. 294/1.1; 294/166; 24/442
[58] Field of Search ........................... 294/1.1, 137, 142, 294/147–150, 156, 165, 166; 24/444, 442, 447, 452; 63/11; 446/269, 353, 486, 901; 231/2.1–5

[56] References Cited

U.S. PATENT DOCUMENTS

| 1,718,792 | 6/1929  | Main    | 446/486 |
| 3,410,023 | 11/1968 | Anello  | 446/353 |
| 4,153,189 | 5/1979  | Hughes  | 294/143 |
| 4,262,385 | 4/1981  | Norman  | 294/149 |
| 4,402,542 | 9/1983  | Kreutzer | 294/156 |
| 4,706,914 | 11/1987 | Ground  | 24/447  |
| 4,724,548 | 2/1988  | London  | 63/11   |
| 4,796,936 | 1/1989  | Sherin  | 294/148 |
| 5,176,452 | 1/1993  | Stern   | 446/486 |

Primary Examiner—Dean Kramer
Attorney, Agent, or Firm—George A. Bode; Daniel E. Maddux; Bode & Associates

[57] ABSTRACT

An apparatus for grasping and carrying substantially cylindrical objects is disclosed. The apparatus is generally comprised of a self-rolling spring strip with opposing concave and convex surfaces and mating hook and loop fastener portions fixedly attached on the opposing surfaces of the strip such that when the strip is in a coiled position, the fastener portions prevent the strip from uncoiling. The strip is biased to an uncoiled position such that when the strip is subjected to a slapping motion about a substantially cylindrical object, the opposing surfaces flatten out and the strip coils around the object. The strip is preferably elongated and made of metal. In an alternate embodiment of the present invention, the apparatus has an aperture on one end which extends through the strip and fastener portions and a mechanical fastener, such as a bolt, for securing the apparatus to a bulkhead or similar panel. In operation, the strip is initially in an uncoiled position. The user grasps one end of the apparatus and slaps it about a substantially cylindrical object. Upon contacting the object, the concave and convex surfaces flatten out and the strip coils around the object. The fastener portions engage and prevent the strip from uncoiling. The user then pulls or carries the object away with the apparatus.

17 Claims, 4 Drawing Sheets

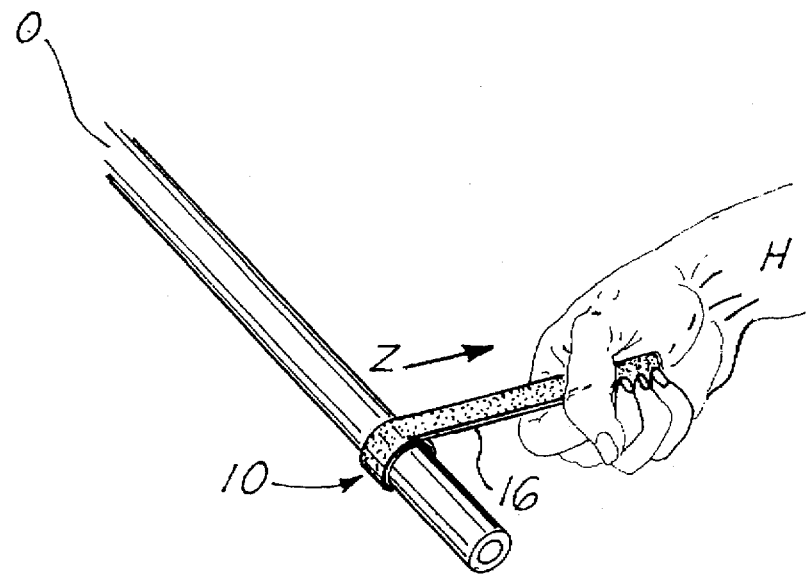
FIG. 6
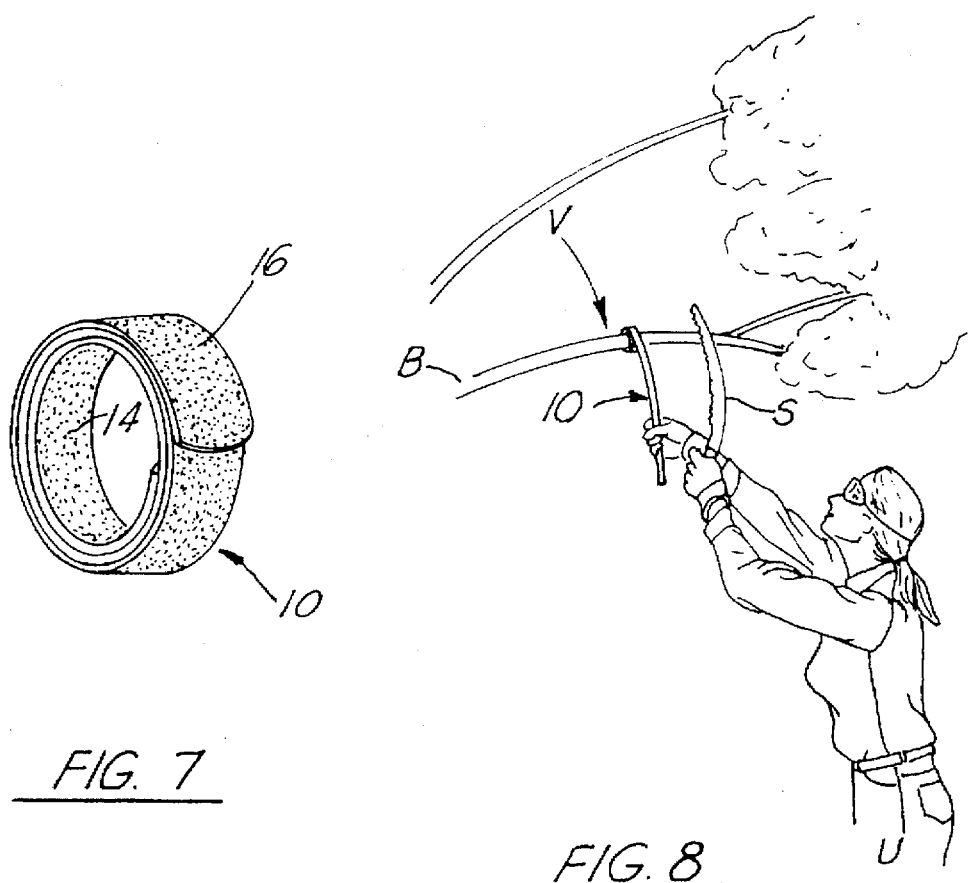
FIG. 7
FIG. 8

SELF-WRAPPING CARRYING DEVICE

BACKGROUND OF THE INVENTION

1. Field of the Invention

The present invention relates to an apparatus for grasping and carrying objects, particularly an apparatus for grasping and carrying substantially cylindrical objects which employs a self-rolling spring strip.

2. General Background

In doing yard work and the like, it is sometimes necessary to grasp and carry or pull objects which are difficult to reach, such as branches that need cutting.

Several devices have been patented which are aimed at grasping objects.

U.S. Pat. No. 5,176,452 issued to Ninth Moon on the application of M. Stern and entitled "Self-Closing Bag" teaches a self-closing bag having front and rear sidewalls interconnected at each end with a spring strip holder running the length of one sidewall and a spring strip provided in the spring strip holder. The bag remains open while the strip is straight, but closes when the strip is bent.

U.S. Pat. No. 3,410,023 issued to J. Anello and entitled "Roll Spring Tape Novelty Toy" discloses a toy animal having a spring strip with ornamental coverings on the top, bottom and/or sides of the strip. The toy changes position from straight to coiled when the strip is bent.

U.S. Pat. No. 4,724,548 issued to J. London and entitled "Hugging Novelty Device" discloses a novelty device comprising a flat elongated spring strip made of plastic and normally coiled with hands attached at each end of the strip such that the strip is uncoiled and positioned around a person to simulate a hug or embrace.

U.S. Pat. No. 4,120,437 issued to C. M. Hara and entitled "Carrier For Skis And Ski Poles" discloses a carrier assembly for carrying a pair of skis and a pair of ski poles which comprises a pair of coupling straps made of flexible material such as woven fabric and affixed together with hook and loop type fasteners on the straps to close the straps. The bottom strap encircles the skis, and the top strap encircles the ski poles.

U.S. Pat. No. 4,470,528 issued W. H. Dyess and entitled "Ski Transport Apparatus" discloses an apparatus similar to the '437 patent for transporting skis which comprises a pair of harnesses having hook and loop type fasteners coupled to an adjustable strap with coupling means such that the harnesses are wrapped around a pair of skis and secured in place with the hook and loop type fasteners. The coupling means couples the harnesses to the adjustable strap.

U.S. Pat. No. 4,087,989 issued to G. D. Taran and entitled "Bracelet" teaches a bracelet comprising a discontinuous, flexible, thermoplastic bracelet structure with ridges on either end, a flexible decorative cover which fits between the ridges in the bracelet structure and means for attaching the decorative cover to the bracelet structure.

U.S. Pat. No. 3,360,261 issued to M.D. Smolensky and entitled "Uncoiling And Recoiling Toy" discloses a toy comprising an elongated, V-shaped, flexible metal strip with the ends of the strip looped around to form hoops and rivets to secure the hoops in place such that the strip coils and uncoils.

U.S. Pat. No. 62,648 issued to Isaac Levine and entitled "Improvement In Cuffs" discloses a cuff made of fur or other suitable material with a coiled spring provided around the cuff and elastic retaining cords connecting the ends of the coiled spring.

However, none of the above-described patents meets the needs of the apparatus of the present invention for the following reasons. First, none of the above-described patents teaches the problem of grasping and carrying objects which are difficult to reach.

The invention of Stern '452 is directed to self-sealing bags, not grasping and carrying objects.

The inventions of Anello '023 and Smolensky '261 are directed to ornamental toys, not a useful apparatus for grasping and carrying objects.

The invention of London '548 is directed to an entertaining novelty device, not a useful apparatus for grasping and carrying objects.

The inventions of Hara '437 and Dyess '528 are primarily directed to devices for carrying skis, not for grasping and carrying objects.

The invention of Taran '989 is directed to an ornamental bracelet, not a useful apparatus for grasping and carrying objects.

The invention of Lewine '648 is directed to a spring cuff for a shirt, not for grasping and carrying objects.

Thus, a need exists for an apparatus for the one-handed grasping and carrying objects which is easily and quickly attached to an object and easily removed therefrom.

A need also exists for an apparatus for the one-handed grasping and carrying objects which is lightweight and reduces to a compact size for easy storage when not in use.

A need also exists for an apparatus for grasping and carrying objects which is simple in design and easy and economical to manufacture.

SUMMARY OF THE PRESENT INVENTION

The preferred embodiment of the apparatus of the present invention solves the aforementioned problems in a straight-forward and simple manner. What is provided is an apparatus for the one-handed grasping and carrying substantially cylindrical objects. The apparatus generally comprises a self-rolling spring strip with concave and convex surfaces and a pair of fastening means fixedly attached to the concave and convex surfaces of the strip such that when the strip is in a coiled position, the fastening means prevent the strip from uncoiling. The strip is biased to an uncoiled position such that when subjected to a slapping motion about an object, the concave and convex surfaces flatten out and the strip coils around the object.

In operation, the strip is initially in an uncoiled position. While the strip is in an uncoiled position, the apparatus is grasped in one hand of the user about one end with the other end free. The apparatus is slapped about a substantially cylindrical object such that the object contacts the concave surface of the strip near the midpoint of the strip. Upon striking the object, the concave and convex surfaces at the point of contact flatten out, causing the portion of the strip from the point of contact to the free end to coil around the object. The other portion of the strip remains in an uncoiled position. The fastening means prevent the coiled portion of the strip from uncoiling. The object is then pulled or carried with the apparatus in one hand of the user.

In view of the above, it is an object of the present invention to provide an apparatus for the one-handed grasping and carrying objects which is easily and quickly attached to an object and easily removed therefrom.

It is a further object of the present invention to provide such an apparatus for the one-handed grasping and carrying objects which is lightweight and reduces to a compact size for easy storage when not in use.

In view of the above objects it is a feature of the present invention to provide an apparatus for grasping and carrying objects which is simple in design and easy and economical to manufacture.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 6 is a bottom perspective view of the embodiment of FIG. 1 further illustrating the one-handed operation of the apparatus;

FIG. 7 is a perspective view of the embodiment of FIG. 1 in the coiled position;

FIG. 8 is a perspective view of the embodiment of FIGURE I further illustrating the apparatus in operation; and, FIG. 9 is a perspective view of an alternate embodiment of the apparatus of the present invention.

DETAILED DESCRIPTION OF THE PREFERRED EMBODIMENT

Figure 1:
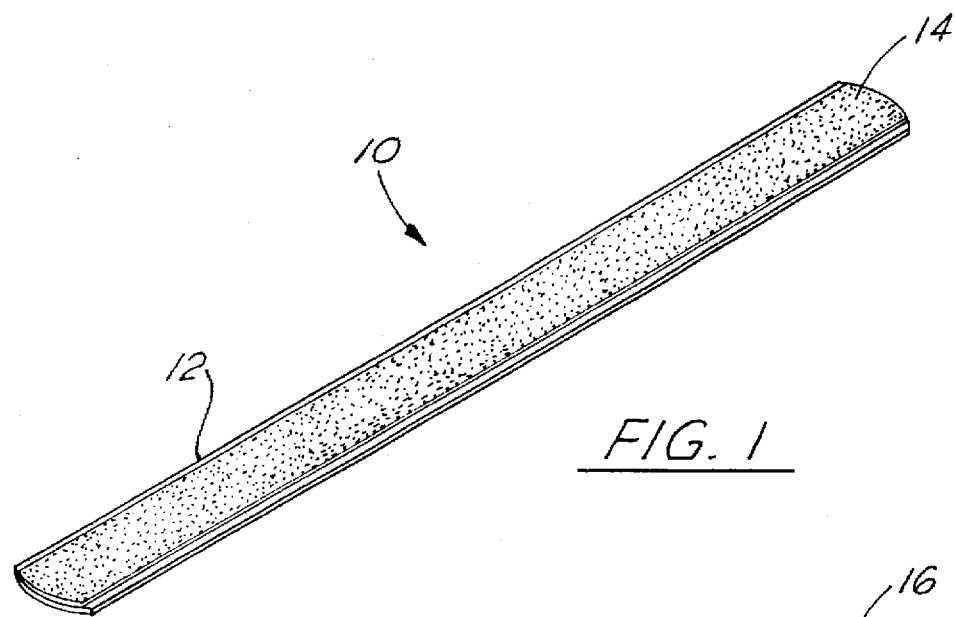
FIG. 1 is a top perspective view of the preferred embodiment of the apparatus of the present invention in the uncoiled position.
Figure 2:
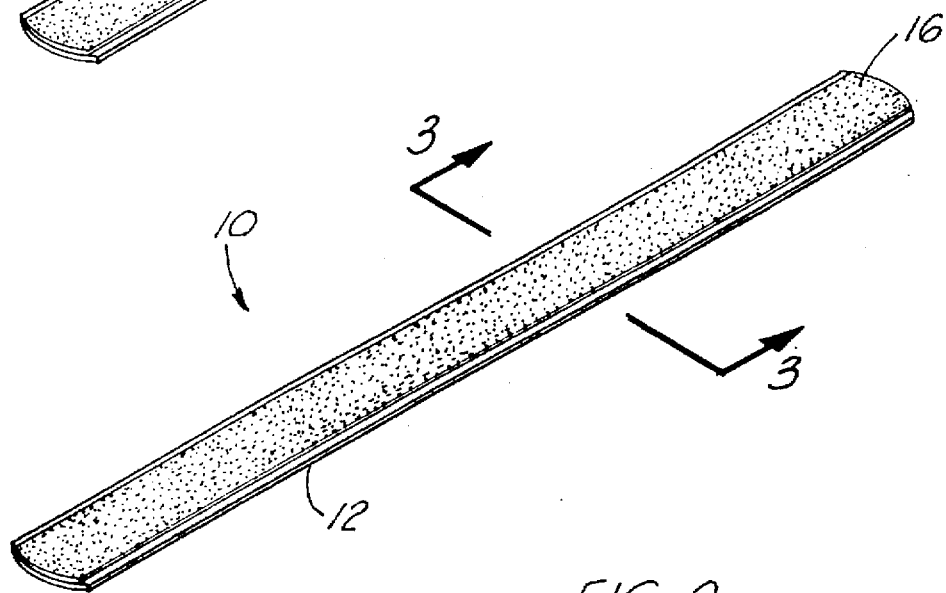
FIG. 2 is a bottom perspective view of the embodiment of FIG. 1.
Figure 3:
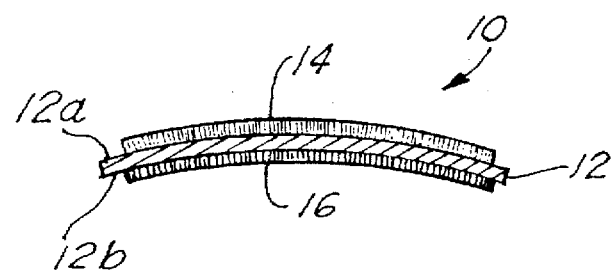
FIG. 3 is an end view of the embodiment of FIG. 1 taken along axis 3—3.

Referring now to the drawings, and in particular FIGS. 1–3, the apparatus of the present invention is designated generally by the numeral 10. Apparatus 10 is generally comprised of self-rolling spring strip 12 and pair of fastening means 14, 16 which are fixedly attached to strip 12, as best seen in FIG. 3.

Spring strip 12 is known in the art and is commonly used in steel roll tape measures. Spring strip 12 has an upper or convex side 12a and an under or opposing concave side 12b when biased to an uncoiled position, as best seen in FIG. 3. Surfaces 12a and 12b tend to keep strip 12 straight or uncoiled. Strip 12 is substantially rectangular in shape and preferably elongated, as best seen in FIGS. 1 and 2. Strip 12 is also preferably made of a metallic substance.

Fastening means 14, 16 are preferably hook and loop type fasteners such as "VELCRO". Fastening means 14 is preferably hook type fastener fixedly attached to surface 12a of strip 12, as seen in FIGS. 1 and 3. Fastening means 16 is preferably loop type fastener fixedly attached to surface 12b, as seen in FIGS. 2 and 3. Fastening means 14, 16 are fixedly attached to strip 12 adhesively, mechanically or both. Fastening means 14, 16 are substantially rectangular in shape, as best seen in FIGS. 1 and 2, respectively. The length of each of surfaces 12a and 12b extends the length of strip 12. The width of strip 12 can, but does not have to, protrude beyond the width of fastening means 14, 16, as seen in FIGS. 1–3.

Figure 4:
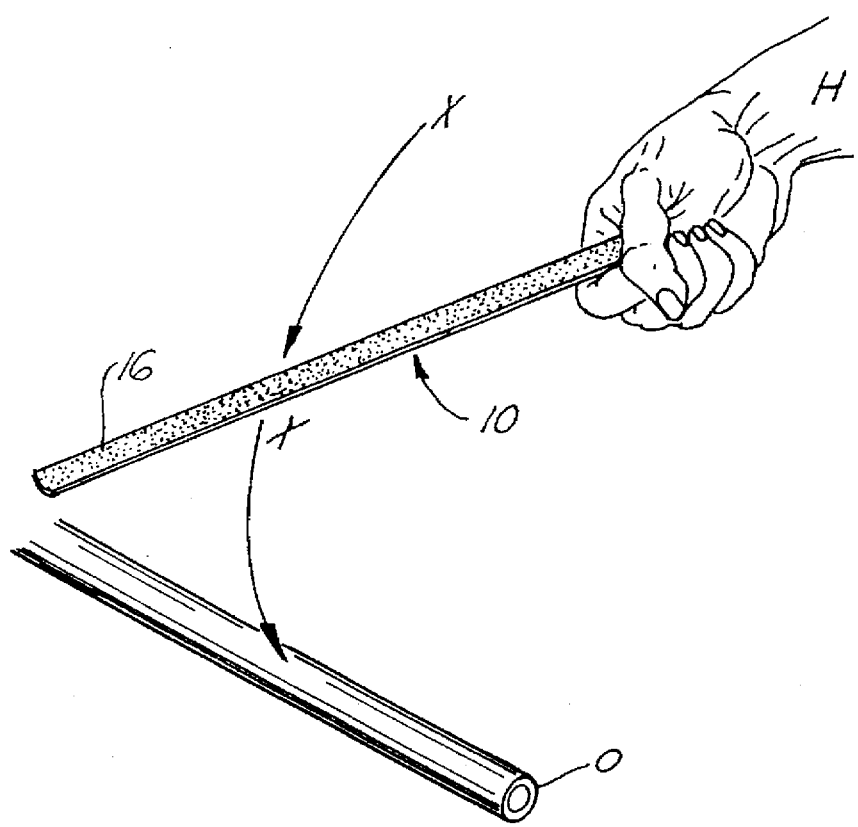
FIG. 4 is a bottom perspective view of the embodiment of FIG. 1 illustrating the one-handed operation of the apparatus.
Figure 5:
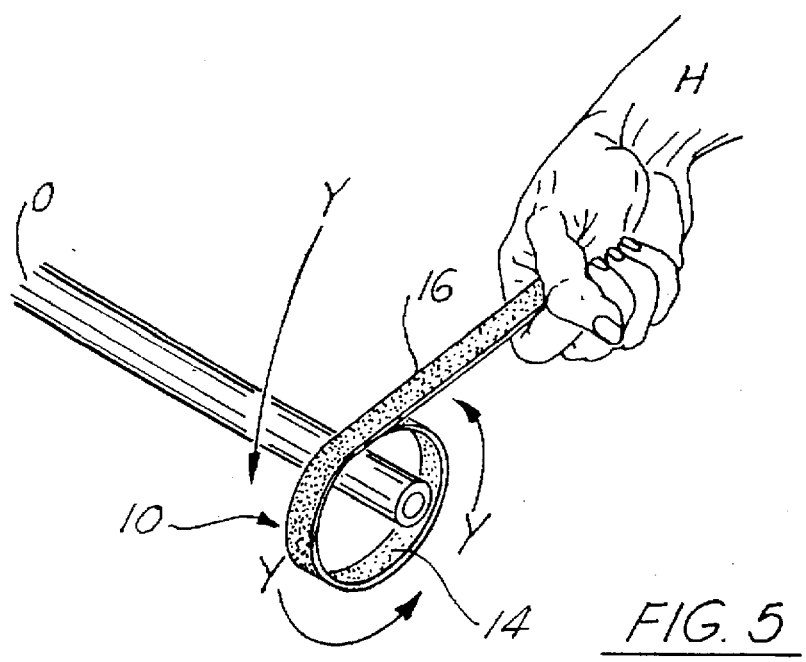
FIG. 5 is a bottom perspective view of the embodiment of FIG. 1 further illustrating the one-handed operation of the apparatus.

Referring now to FIGS. 4–6, the one-handed operation of apparatus 10 is illustrated. Strip 12 is initially in the uncoiled position of FIGS. 1, 2 and 4. One end of apparatus 10 is grasped in one hand H of a user of apparatus 10, with the other end of apparatus 10 free. Concave surface 12b and loop type fastener 16 of apparatus 10 face upwardly. Apparatus 10 is swung at substantially cylindrical object O in a slapping or snapping motion, as indicated by ARROWS X in FIG. 4. Object O is illustrated as a garden hose, but can be a tree branch, jumper cables, extension cord or a similar substantially cylindrical item. Convex surface 12a contacts object O near the midpoint of strip 12, as seen in FIG. 5. Upon striking object O, surfaces 12a and 12b flatten out at the point of contact with object O. As surfaces 12a and 12b flatten out, the portion of strip 12 from the point of contact to the free end coils around object O, as indicated by ARROWS Y in FIG. 5. The portion of strip 12 from the point of contact to hand H remains in an uncoiled position. As strip 12 coils around object O, loop type fastener 16 engages hook type fastener 14 to prevent strip 12 from uncoiling. After strip 12 is coiled around object O, the user then pulls or carries object O with his hand H, as indicated by ARROW Z in FIG. 6.

Referring to FIG. 8, another use of apparatus 10 is illustrated. Apparatus 10 is used to grasp tree branches out of normal reach so that the branches may be cut. User U grasps branch B with apparatus 10 in a manner similar to that illustrated in FIGS. 4–6. User U then pulls branch B closer to her so that she may cut branch B with saw S, as indicated by ARROW V in FIG. 8.

When not in use, apparatus 10 may be coiled up for easy compact storage, as best seen in FIG. 7.

Figure 9:
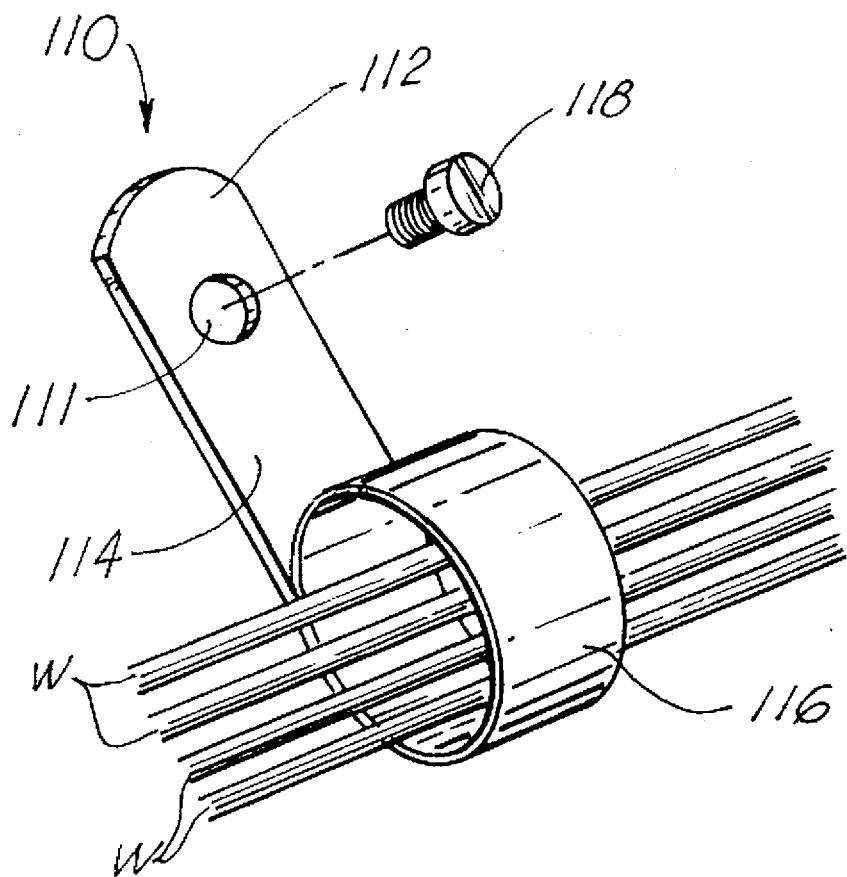

Referring now to FIG. 9, an alternate embodiment of the present invention is illustrated. Apparatus 110 has aperture 111 which extends through one end of strip 112 and pair of fastening means 114, 116. Mechanical fastener 118, preferably a bolt, rigidly secures apparatus 110 to a bulkhead or similar panel (not shown). In all other respects, apparatus 110 is similar to apparatus 10.

In this alternate embodiment apparatus 110 can operate as a wire loom. The end of strip 112 opposite aperture 111 is coiled around a group of wires W to form a closed loop. Hook and loop type fasteners 114, 116 prevent strip 112 from uncoiling. Preferably, more than one apparatus 110 is used to make the wire loom. A larger embodiment of apparatus 110 may be employed as a reusable retainer for the large cable and hose reels used in industry.

As can be seen from the drawing and above description, the apparatus of the present invention is simple in design, requiring only a few parts. Furthermore, the apparatus is made simply with ordinary inexpensive items, thus being easy and economical to manufacture.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for grasping and carrying substantially cylindrical objects, comprising:
    (a) a self-rolling spring strip of a metallic substance with opposing concave and convex surfaces which is biased to an uncoiled position such that when said strip is subjected to a slapping motion about a substantially cylindrical object, said opposing surfaces flatten out and said strip coils around the object; and, (b) a pair of fastening means fixedly attached on said opposing surfaces such that when said strip is in a coiled position, said fastening means prevent said strip from uncoiling.

2. The apparatus of claim 1, wherein said strip is elongated.

3. The apparatus of claim 1, wherein said strip is substantially rectangular in shape.

4. The apparatus of claim 3, wherein said pair of fastening means is substantially rectangular in shape.

5. The apparatus of claim 4, wherein the width of said strip protrudes beyond the width of said pair of fastening means.

6. The apparatus of claim 4, wherein the length of said fastening means extends the length of said strip.

7. The apparatus of claim 1, wherein said pair of fastening means is hook and loop type fasteners.

8. The apparatus of claim 1, wherein said strip and said fastening means have matching apertures at one end, and further comprising:

(c) a fastener which fits through said apertures to fasten said apparatus to a panel.

9. An apparatus for grasping and carrying substantially cylindrical objects, comprising:

(a) an elongated self-rolling spring strip substantially rectangular in shape with opposing concave and convex surfaces which is biased to an uncoiled position such that when said strip is subjected to a slapping motion about a substantially cylindrical object, said opposing surfaces flatten out and said strip coils around the object; and, (b) a pair of fastening means fixedly attached on said opposing surfaces such that when said strip is in a coiled position, said fastening means prevent said strip from uncoiling.

10. The apparatus of claim 9, wherein said strip made of a metallic substance.

11. The apparatus of claim 9, wherein said pair of fastening means is hook and loop type fasteners.

12. The apparatus of claim 9, wherein said pair of fastening means is substantially rectangular in shape.

13. The apparatus of claim 12, wherein the width of said strip protrudes beyond the width of said pair of fastening means.

14. The apparatus of claim 12, wherein the length of said fastening means extends the length of said strip.

15. The apparatus of claim 9, wherein said strip and said fastening means have matching apertures at one end, and further comprising:

(c) a fastener which fits through said apertures to fasten said apparatus to a panel.

16. An apparatus for grasping and carrying substantially cylindrical objects, comprising:

(a) an elongated self-rolling spring strip of a metallic substance with opposing concave and convex surfaces which is biased to an uncoiled position such that when said strip is subjected to a slapping motion about a substantially cylindrical object, said opposing surfaces flatten out and said strip coils around the object; and, (b) a pair of hook and loop type fasteners fixedly attached on said opposing surfaces such that when said strip is in a coiled position, said fasteners prevent said strip from uncoiling.

17. The apparatus of claim 16, wherein said strip and said fasteners have matching apertures at one end, and further comprising:

(c) a fastener which fits through said apertures to fasten said apparatus to a panel.

* * * * *